United States Patent
Nelson

(10) Patent No.: US 8,036,330 B2
(45) Date of Patent: Oct. 11, 2011

(54) SYSTEM AND METHOD FOR FREQUENCY SYNCHRONIZATION IN A WIRELESS NON-HIERARCHICAL NETWORK

(75) Inventor: Paul Nelson, Frisco, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1296 days.

(21) Appl. No.: 11/648,335

(22) Filed: Dec. 29, 2006

(65) Prior Publication Data

US 2008/0159457 A1 Jul. 3, 2008

(51) Int. Cl.
*H04L 7/00* (2006.01)
(52) U.S. Cl. .......... 375/356; 704/270.1; 455/39
(58) Field of Classification Search .......... 375/356
See application file for complete search history.

(56) References Cited

U.S. PATENT DOCUMENTS

| | | | | |
|---|---|---|---|---|
| 4,041,496 A * | 8/1977 | Norris | ........... | 342/418 |
| 4,206,414 A * | 6/1980 | Chapman | ........... | 327/160 |
| 4,263,615 A * | 4/1981 | Steinmetz et al. | ........... | 348/540 |
| 4,486,782 A * | 12/1984 | Bretl et al. | ........... | 348/737 |
| 4,980,899 A * | 12/1990 | Troost et al. | ........... | 375/357 |
| 5,565,814 A * | 10/1996 | Fukuchi | ........... | 330/52 |
| 5,726,984 A * | 3/1998 | Kubler et al. | ........... | 370/349 |
| 5,790,536 A * | 8/1998 | Mahany et al. | ........... | 370/338 |
| 5,825,222 A * | 10/1998 | Omori | ........... | 327/156 |
| 5,834,980 A * | 11/1998 | Pitio et al. | ........... | 331/2 |
| 5,892,631 A * | 4/1999 | Howell et al. | ........... | 360/51 |
| 5,953,374 A * | 9/1999 | Yeh | ........... | 375/242 |
| 6,246,738 B1 * | 6/2001 | Acimovic et al. | ........ | 375/240.03 |
| 6,427,088 B1 * | 7/2002 | Bowman et al. | ........... | 607/60 |
| 6,826,607 B1 * | 11/2004 | Gelvin et al. | ........... | 709/224 |
| 6,836,507 B1 * | 12/2004 | Gifford et al. | ........... | 375/150 |
| 7,110,435 B1 * | 9/2006 | Sorrells et al. | ........... | 375/147 |
| 7,146,218 B2 * | 12/2006 | Esteller et al. | ........... | 607/45 |
| 7,191,355 B1 * | 3/2007 | Ouellette et al. | ........... | 713/400 |
| 7,276,985 B2 * | 10/2007 | Hirano | ........... | 332/128 |
| 7,298,787 B2 * | 11/2007 | Priotti | ........... | 375/267 |
| 7,346,129 B2 * | 3/2008 | Gaikwad | ........... | 375/340 |
| 7,362,838 B2 * | 4/2008 | Mizukami et al. | ........... | 375/362 |
| 7,430,257 B1 * | 9/2008 | Shattil | ........... | 375/347 |
| 7,440,416 B2 * | 10/2008 | Mahany et al. | ........... | 370/254 |
| 7,454,218 B2 * | 11/2008 | Mo et al. | ........... | 455/502 |
| 7,492,773 B2 * | 2/2009 | Hester et al. | ........... | 370/401 |
| 7,551,591 B2 * | 6/2009 | Erlich et al. | ........... | 370/338 |
| 7,558,583 B2 * | 7/2009 | Ledeczi et al. | ........... | 455/456.1 |
| 7,583,639 B2 * | 9/2009 | Mahany | ........... | 370/335 |
| 2001/0005361 A1 * | 6/2001 | Lipsanen | ........... | 370/503 |
| 2003/0014763 A1 * | 1/2003 | Chappell et al. | ........... | 725/111 |
| 2003/0053493 A1 * | 3/2003 | Graham Mobley et al. | .. | 370/538 |
| 2003/0181183 A1 * | 9/2003 | Ventura | ........... | 455/258 |
| 2005/0169201 A1 * | 8/2005 | Huylebroeck | ........... | 370/311 |
| 2005/0175038 A1 * | 8/2005 | Carlson et al. | ........... | 370/503 |
| 2005/0185738 A1 * | 8/2005 | Gaikwad | ........... | 375/340 |
| 2006/0052066 A1 * | 3/2006 | Cleveland et al. | ........... | 455/101 |
| 2006/0268882 A1 * | 11/2006 | Mademann | ........... | 370/394 |
| 2007/0067119 A1 * | 3/2007 | Loewen et al. | ........... | 702/57 |
| 2007/0076650 A1 * | 4/2007 | Manjeshwar et al. | ........ | 370/328 |
| 2007/0232244 A1 * | 10/2007 | Mo et al. | ........... | 455/91 |
| 2008/0055014 A1 * | 3/2008 | Tsfaty | ........... | 332/127 |

(Continued)

*Primary Examiner* — Chieh M Fan
*Assistant Examiner* — Santiago Garcia

(57) ABSTRACT

The present disclosure relates generally to systems and methods for frequency synchronization in a non-hierarchical network. In one example, the method includes receiving, by a node in a wireless non-hierarchical network, frequency synchronization messages from other nodes. The method calculates an average frequency based on the frequency synchronization messages, calculates a control frequency based on the average frequency, and sets an oscillator of the node to the control frequency.

25 Claims, 4 Drawing Sheets

U.S. PATENT DOCUMENTS

| | | | |
|---|---|---|---|
| 2008/0068996 A1* | 3/2008 | Clave et al. | 370/230.1 |
| 2008/0072025 A1* | 3/2008 | Staszewski et al. | 712/241 |
| 2008/0159457 A1* | 7/2008 | Nelson | 375/356 |
| 2009/0132197 A1* | 5/2009 | Rubin et al. | 702/141 |

* cited by examiner

SYSTEM AND METHOD FOR FREQUENCY SYNCHRONIZATION IN A WIRELESS NON-HIERARCHICAL NETWORK

BACKGROUND

A wireless non-hierarchical network, such as a mobile ad hoc network (MANET), is a collection of devices (e.g., nodes) capable of wirelessly communicating and networking. Generally, ad hoc wireless networks operate in a distributed, not-fully-connected, asynchronous, and mobile manner. Examples of ad hoc networks include wireless sensor networks, packet radio networks, and wireless mesh networks. An ideal ad hoc network provides multi-hop transmission, high mobility, self-organization, seamless handover, quality of service (QoS), and high spectrum efficiency.

In general, an ad hoc network has no central controllers, such as access points (AP) in a wide local area network (WLAN) environment or base stations (BS) as described with respect to IEEE 802.16. Therefore, nodes within an ad hoc network cannot rely on a central control architecture to provide synchronization and prevent collisions.

To address these types of issues, a node in an ad hoc network generally uses an algorithm that provides for time synchronization with other nodes. For example, the Timer Synchronization Function (TSF) specified by the Institute of Electrical and Electronics Engineers (IEEE) Working Group 802.11 provides time synchronization with errors ranging from approximately fifty microseconds to two thousand microseconds, while the Automatic Self-time-correcting Procedure (ASP) provides time synchronization with errors of approximately 100 microseconds. Such errors are undesirable, and improvements in synchronization between nodes in an ad hoc network are needed.

SUMMARY

In one embodiment, a method comprises receiving, by a first node in a wireless non-hierarchical network, a plurality of frequency synchronization messages from at least second and third nodes. An average frequency is calculated based on the frequency synchronization messages, a control frequency is calculated based on the average frequency, and an oscillator of the first node is set to the control frequency.

In another embodiment, a method comprises receiving, by a first node operating at a first frequency from a second node operating at a second frequency in a wireless non-hierarchical network, first and second synchronization messages containing first and second values, respectively, corresponding to contents of a first counter of the second node at the time the first and second synchronization messages were created, wherein the contents of the first counter are regularly modified based on the second frequency. The method includes receiving, by the first node from a third node operating at a third frequency in the wireless non-hierarchical network, third and fourth synchronization messages containing third and fourth values, respectively, corresponding to contents of a second counter of the third node at the time the third and fourth synchronization messages were created, wherein the contents of the second counter are regularly modified based on the third frequency. The first, second, third, and fourth counter values are stored with a value corresponding to contents of a third counter of the first node at approximately the time the first, second, third, and fourth synchronization messages are received, respectively, wherein the contents of the third counter are regularly modified based on the first frequency. An average frequency of the second and third nodes is calculated based on the first, second, third, and fourth values in conjunction with the corresponding value of the contents of the third counter. The average frequency is fed into a control algorithm to calculate a control frequency, and the first frequency is set to the control frequency.

In still another embodiment, a method comprises determining, by a first node in a wireless non-hierarchical network, that a predefined trigger event has occurred. The method includes generating a frequency synchronization message containing a value corresponding to contents of a counter at the time the frequency synchronization message is generated, wherein the contents of the counter are regularly modified based on an oscillator frequency of the first node. The frequency synchronization message is transmitted to a second node in the wireless non-hierarchical network.

In yet another embodiment, a device comprises a wireless communications interface configured to communicate with other devices in a wireless non-hierarchical network, a processor coupled to the wireless communications interface, a memory coupled to the processor, and a plurality of instructions stored in the memory for execution by the processor. The instructions include instructions for: receiving a plurality of synchronization messages from at least some of the other devices, calculating an average frequency based on the synchronization messages, feeding the average frequency into a control algorithm to calculate a control frequency, and setting a frequency used to control communications with the other devices via the wireless communications interface to the control frequency.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
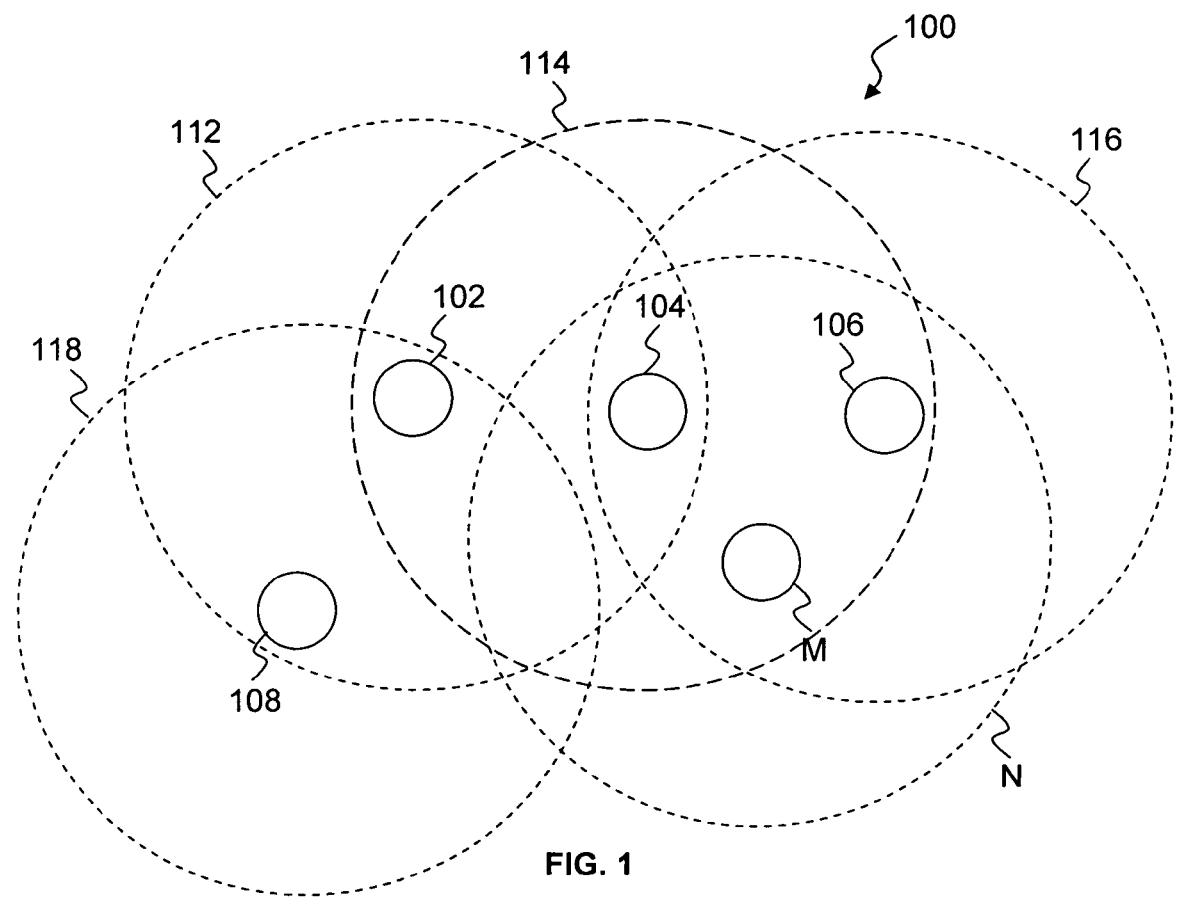
FIG. 1 is a diagram of one embodiment of a network in which the present invention may be implemented.

It is to be understood that the following disclosure provides many different embodiments, or examples, for implementing different features of the disclosure. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, in one embodiment, a wireless non-hierarchical network 100 is configured with multiple nodes 102, 104, 106, 108, . . . , M. In the present example, the network 100 is a MANET, but it is understood that the present disclosure may be applied to any wireless non-hierarchical network, including wireless sensor networks, packet radio networks, and wireless mesh networks.

Each node 102-M has an associated coverage area 112, 114, 116, 118, . . . , N, respectively, within which each node may send information to other nodes within the network 100. It is understood that the coverage areas for a particular node 102-M may not be equal and that the shape of a coverage area may not correspond to a circle as shown. Furthermore, different nodes may have different coverage areas, and a coverage area for a single node may vary depending on the environment, available power, and other factors.

In the present example, node 102 is within the coverage area of nodes 104 and 108, node 104 is within the coverage area of nodes 102, 106, and M, node 106 is within the coverage area of nodes 104 and M, node 108 is within the coverage area of node 102, and node M is within the coverage area of nodes 104 and 106. It is understood that the coverage area of two nodes may not be identical. For example, the node 102 may have more powerful transmission capabilities than the node 108 and so the node 108 may be able to receive signals from the node 102 but not transmit signals at that range.

Figure 2:
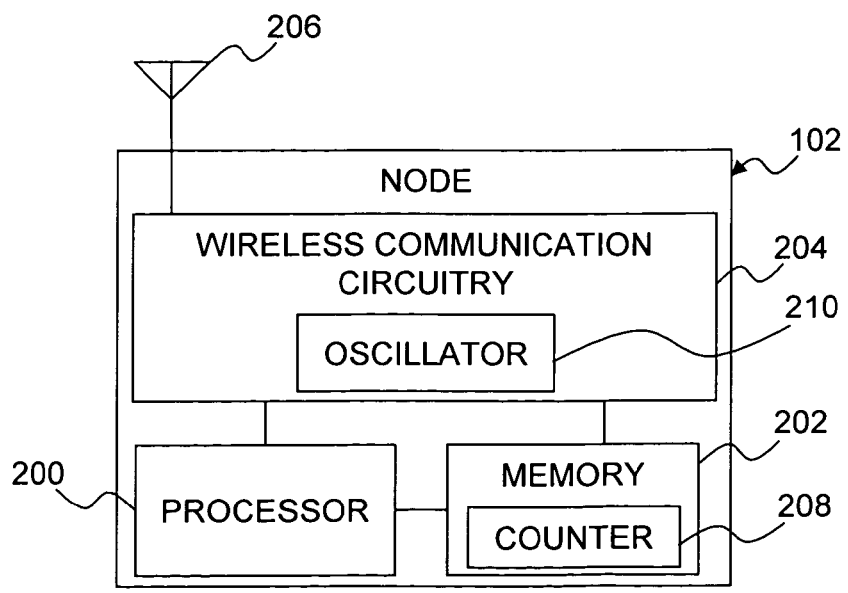
FIG. 2 is a diagram of one embodiment of a node that may be used within the network of FIG. 1.

With additional reference to FIG. 2, one embodiment of the node 102 of FIG. 1 is illustrated. The node 102 includes a processor 200 that is coupled to a memory 202 and wireless communication circuitry 204, which is in turn coupled to an antenna 206. The memory 202 contains instructions for execution by the processor 200 for processing, sending, and receiving wireless communications via the wireless communication circuitry 204. The memory 202 may also contain values for a counter 208. The memory 202 may include both general memory and specialized memory (e.g., hardware registers) and may be distributed. For example, particular hardware registers and memory may be associated with the processor 200 and other registers and memory, including buffers, may be associated with the wireless communication circuitry 204.

The wireless communication circuitry 204 may contain or be coupled to a controllable radio frequency (RF) oscillator 210 that is set to a desired frequency for the network 100. The node 102 derives its radio frequency from the oscillator 210, but the frequency may not be exact (e.g., may be in error). Such an error may be caused by factors such as temperature, voltage variations, and oscillator aging.

In the present example, the oscillator 210 may drive the hardware-based counter 208 that counts the number of oscillator cycles. The counter 208 may be large enough to count for several seconds without reaching its maximum count value. For example, when driven by a 10 MHz oscillator, a thirty-two bit counter will reach its maximum value in approximately 400 seconds. When the counter 208 reaches its maximum value, it returns to zero and continues counting. The value of the counter 208 may be used during frequency synchronization with other nodes, as will be discussed below. Although the following examples assume that the counter 208 is incremented as the oscillator 210 generates the frequency (e.g., the counter may be incremented at the peak of each cycle), the counter may be decremented in some embodiments. Furthermore, the counter 208 may be incremented or decremented at other rates (e.g., every two cycles) rather than every cycle.

It is understood that other counting mechanisms may be employed to track the frequency of the oscillator 210. However, any mechanism used should be sensitive to the introduction of delays that may alter the actual count corresponding to the oscillator frequency. For example, rather than using the value of the counter, an interrupt may be generated. The interrupt may be used by a software process that is tracking the frequency of the oscillator, but the software process may need priority in processing in order to minimize delays that may introduce errors in the trigger's timing. In the case of the hardware-based counter described previously, the hardware may need to be given priority to avoid delays. The generation and transmission of a synchronization message containing the counter value or other indicator that is to be sent to a node may need priority over other messages to minimize delays, and the node receiving the synchronization message may need to give synchronization messages priority in processing to minimize delays.

Although not shown, it is understood that the node 102 may include other components, such as a microphone, speaker, and keys for manual data entry and for controlling the node 102. Each node 102-M may be any type of wireless device capable of using the network 100 of FIG. 1. Examples of such devices include personal computers, personal digital assistants (PDAs), and cellular phones. It is also understood that the blocks depicted in FIG. 2 are functional and that no presumption is made that the blocks are implemented in separated integrated circuits or electrical components. Several of the functional blocks may be integrated in a single package or in multiple packages. Several of the functional blocks may be integrated in a system on a chip.

Referring again specifically to FIG. 1, in a conventional MANET, nodes 102-M generally use time synchronization in an attempt to circumvent the problems caused by lack of a central controller in the network 100. However, current time synchronization algorithms are not sufficient to enable the nodes to synchronize closely enough to allow for good frequency synchronization. Frequency synchronization may minimize noise and aid in sampling by allowing for the use of higher order modulation. Accordingly, it is generally desirable to provide frequency synchronization between nodes.

In various embodiments of the present disclosure, any of several control algorithms may be used to control a node's frequency. For example, Proportional, Integral, Differential (PID) algorithms, well known to those skilled in the art, may be used to control the node's frequency. Variations of these algorithms using only proportional, or only proportional and integral terms, or some other combination of proportional, integral, and differential processing may also be employed. In some examples, one algorithm may be used to aggressively vary the frequency during initial synchronization or during major system disturbances, and a second, less aggressive, algorithm may be used once the system has converged to some degree.

Figure 3:
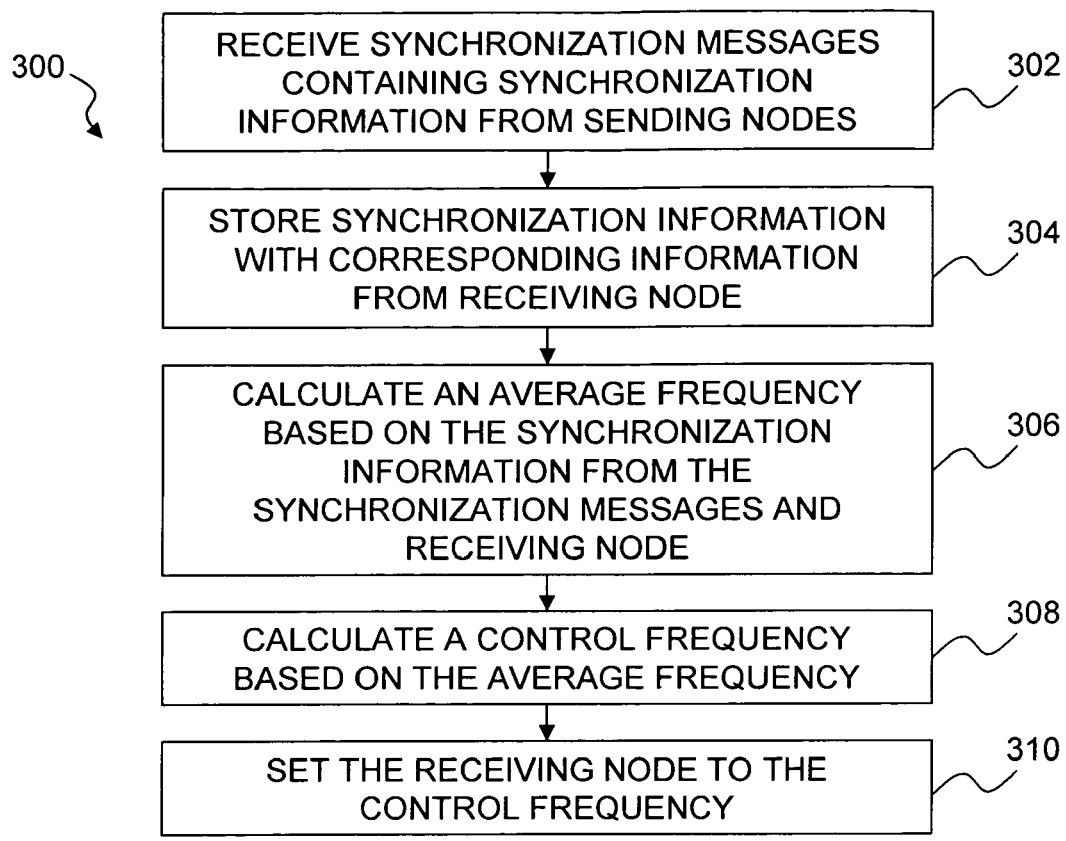
FIG. 3 is a flowchart illustrating one embodiment of a method for synchronizing the frequency of a node within the network of FIG. 1 with other nodes of the network.

Referring to FIG. 3, a method 300 may be used by a node (e.g., the node 102) in a wireless non-hierarchical network (e.g., the network 100 of FIG. 1) to synchronize its oscillator frequency with the oscillator frequencies of other nodes. In the present example, the synchronized frequency is based on an average value of the frequencies of other nodes within the network 100 and at least some of the other nodes are calculating average frequencies as well. In this manner, the average frequencies used by the nodes may converge on a single frequency as the nodes synchronize, although slight variations in frequency may still exist between the nodes due to latency and similar issues.

In step 302, the node 102 receives frequency synchronization messages from other nodes. Each node (including the node 102) may periodically transmit such a synchronization message to other nodes. The synchronization messages may be transmitted using a relatively simple modulation scheme so that tight frequency synchronization is not required. The synchronization message may be transmitted as a separate message or may be included in another message. For example, in a Direct Sequence Spread Spectrum-Orthogonal Frequency Division Multiplexing (DSSS-OFDM) system, the synchronization message may be transmitted as part of the DSSS preamble. In the present example, the synchronization message contains an identifier of the transmitting node and frequency synchronization information (e.g., a frequency counter value such as the contents of the sending node's frequency counter).

In step 304, after receiving a synchronization message, the receiving node 102 stores the identifier and synchronization information (e.g., frequency counter value) along with corresponding information of the receiving node (e.g., a frequency counter value from approximately the time the synchronization message was received). As stated previously, priority may be given to the processing and storage of the synchronization message in order to minimize the amount of time that elapses between the receipt of the synchronization message and the storage of the corresponding frequency counter value of the receiving node 102. Multiple synchronization messages may be received and stored from a single node in a table, link list, or other storage format.

In step 306, the receiving node 102 may calculate an average frequency based on the synchronization messages from one or more nodes of the network 100. For example, the receiving node 102 may compare a difference between two frequency counter values from a sending node with the difference between the two corresponding frequency counter values from the receiving node to determine an approximate oscillator frequency of the sending node. It is understood that the receiving node 102 may examine more than two frequency counter values in some embodiments.

In step 308, the receiving node 102 may calculate a control frequency based on the average frequency. For example, the average frequency may be fed into a control algorithm that uses the average frequency with other parameters to generate the control frequency. In step 310, the receiving node 102 sets its oscillator to the control frequency.

The method 300 is scalable and so can handle variations in the number of local nodes included in the synchronization calculations. Method 300 is tolerant of new nodes entering the system and nodes leaving the system, as well as other disruptions within the system. In general, the results (e.g., the average calculated frequency) will become more stable as more nodes are sampled. Furthermore, it is not required for all the nodes to sample the same group of nodes. For example, in a system of ten nodes numbered 1 through 10, node 1 may calculate its frequency control settings based on inputs from nodes 2, 3, 4, 5, and 6, while node 6 may calculate its frequency control settings based on inputs from nodes 5, 7, 8, 9, and 10. In this example, application of the present disclosure may still result in a stable, common frequency across the system.

Figure 4:
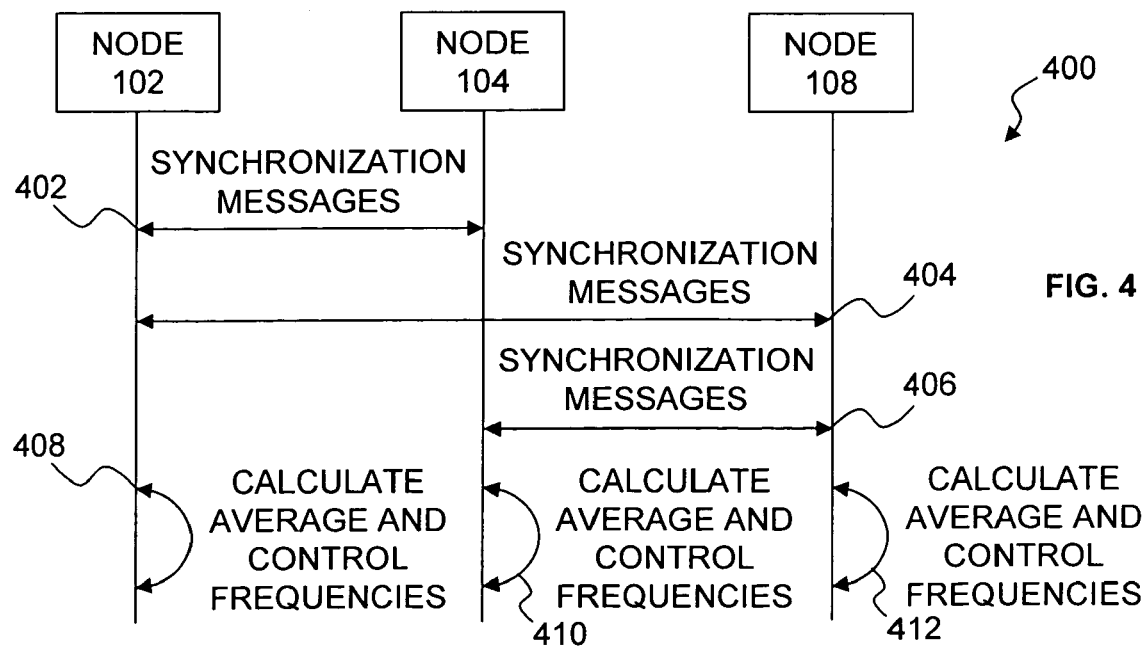
FIG. 4 is a sequence diagram illustrating one embodiment of a sequence of messages between nodes of the network of FIG. 1.

With additional reference to FIG. 4, in one embodiment, a sequence diagram 400 illustrates the transmission of frequency synchronization messages between nodes in a wireless non-hierarchical network such as the network 100 of FIG. 1. For purposes of example, nodes 102, 104, and 108 of FIG. 1 are used.

In steps 402 and 404, node 102 transmits frequency synchronization messages to and receives frequency synchronization messages from nodes 104 and 108, respectively. In step 406, node 104 transmits frequency synchronization messages to and receives frequency synchronization messages from node 108. Although the sequence diagram 400 illustrates the transmission and reception of frequency synchronization messages to and from a node as occurring simultaneously, it is understood that this is not needed. Each node may transmit its frequency synchronization messages at a particular time (e.g., every second), based on a particular occurrence (e.g., every ten thousand clock cycles), or based on another trigger. In the present example, the frequency synchronization messages are sent multiple times before the node's counter returns to zero. Sending messages too frequently may unduly burden a node's processing capabilities and bandwidth, while too few messages may render the frequency synchronization process ineffective. In addition, although the frequency synchronization messages are illustrated as being sent in separate steps, it is understood that a node may broadcast a single frequency synchronization message to multiple nodes.

In steps 408, 410, and 412, nodes 102, 104, and 108, respectively, calculate an average frequency, use the average frequency to calculate a control frequency, and modify their oscillator frequency using the control frequency. Although the calculations are shown in the sequence diagram 400 as occurring simultaneously, it is understood that each node may perform its calculations at a different time. For example, node 102 may perform its calculations after step 404. As each node 102, 104, and 108 may calculate an average frequency based on the average frequencies of the other nodes, the frequency of each node's oscillator may converge on a frequency similar to that of the other nodes. Although exact synchronization may not occur due to latency and similar factors, the nodes may achieve frequency synchronization within a relatively narrow range compared to processes that rely solely on time-based synchronization. As the nodes 102, 104, and 108 receive frequency synchronization messages at a fairly frequent rate, they will approach a similar frequency despite differences in when the calculations may occur. Furthermore, the actual frequency on which the nodes converge may be of little consequence, as all of the nodes are synchronized. For example, the nodes may all have 10 MHz oscillators but may converge on a frequency of 10.1 MHz, which is fine as the nodes are synchronized.

Figure 5:
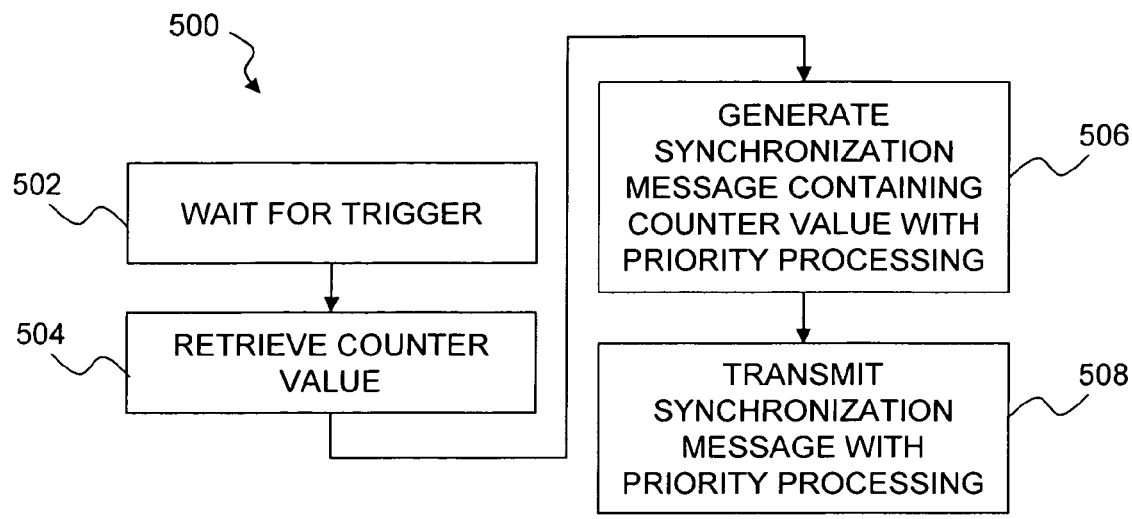
FIG. 5 is a flowchart illustrating one embodiment of a method for sending a frequency synchronization message to another node.

Referring to FIG. 5, in another embodiment, a method 500 may be used by a node (e.g., the node 102 of FIG. 1) to send frequency synchronization messages. As described previously, the method 500 may have priority in the sending node 102 in order to minimize delays in processing and transmitting frequency synchronization messages. In step 502, the method 500 may wait for a predefined trigger. Examples of a trigger include the expiration of a time period or the counting of a predefined number of oscillator cycles. Although the time period or other trigger may vary somewhat, a reasonably short interval should be used for the system to converge in a short time. In step 504, after the trigger occurs, a value is retrieved from a counter associated with an RF oscillator of the sending node 102. In the present example, the value is an integer that is incremented for each cycle of the oscillator, but other values may be used. The retrieval of the counter value may be given priority in processing by the node 102 once the trigger occurs to minimize the number of times the value is incremented between the trigger and the retrieval.

In step 506, the node 102 may generate a frequency synchronization message containing the counter value. The frequency synchronization message may be a standalone message or may be included in another message (e.g., encapsulated). As with the retrieval of the counter value, the generation of the frequency synchronization message may be given priority in order to minimize the amount of error introduced by time delays in generating the message. In step 508, the frequency synchronization message may be transmitted. Again, the transmission may be given priority to minimize time delays.

Figure 6:
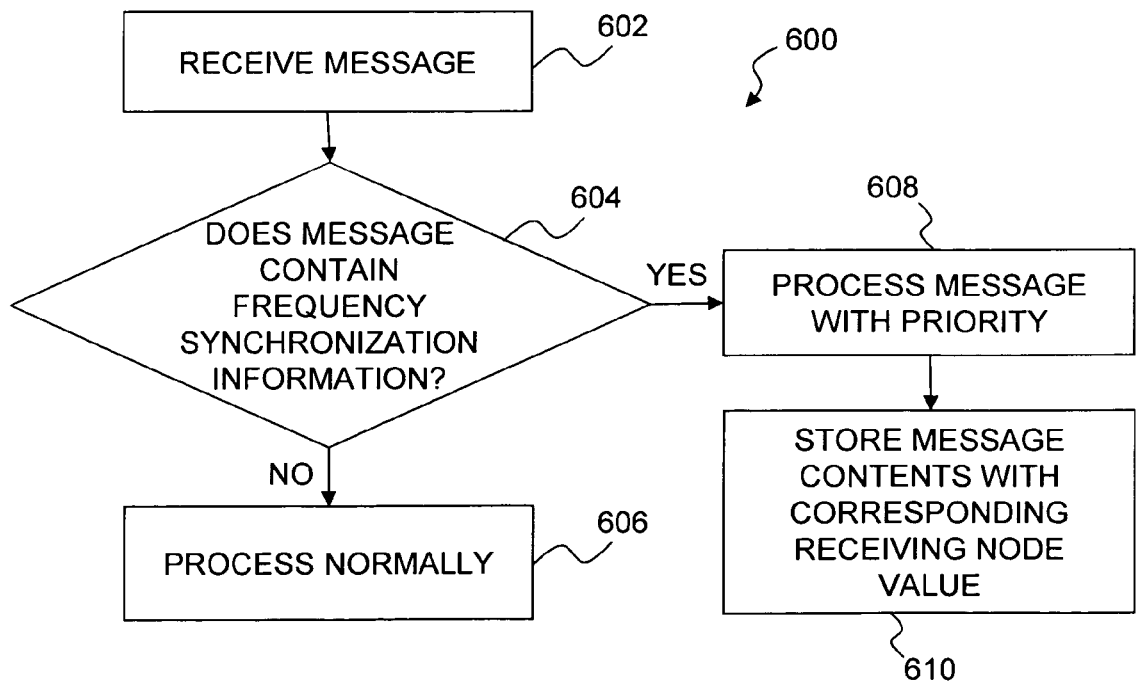
FIG. 6 is a flowchart illustrating one embodiment of a method for receiving a frequency synchronization message from another node.

Referring to FIG. 6, in another embodiment, a method 600 may be used by a node (e.g., the node 102 of FIG. 1) to receive frequency synchronization messages. As described previously, the method 600 may have priority in the receiving node 102 in order to minimize delays in processing and receiving frequency synchronization messages. In step 602, the node 102 executing the method 600 may receive a message and, in step 604, may determine whether the message contains frequency synchronization information. For example, a message header may be examined if the message is a standalone frequency synchronization message. If the message is another type of message (i.e., a non-frequency synchronization message such as a DSSS preamble), a flag indicating the presence of synchronization information may be checked or a field where frequency synchronization information can be stored may be examined. It is understood that, in systems where the receiving node is instructed to look for a particular message type (e.g., standalone or encapsulated), then only messages of that type may be examined for frequency synchronization information.

If the message does not contain frequency synchronization information, the method 600 continues to step 606, where the message is processed normally. If the message does contain frequency synchronization information, the method 600 moves to step 608, where the message is processed with priority. As with the priority processing used by the sending node, the receiving node 102 may process the frequency synchronization message in a priority manner to minimize time delays. In step 610, the frequency synchronization contents may be stored with a corresponding value from a counter of the receiving node. As described previously, the receiving node counter is associated with the receiving node's RF oscillator. The storage of the contents and the receiving node's counter value may be performed in a priority manner to minimize the number of times the value is incremented in the receiving node's counter between the time the frequency synchronization message is processed and the time it is stored.

Figure 7:
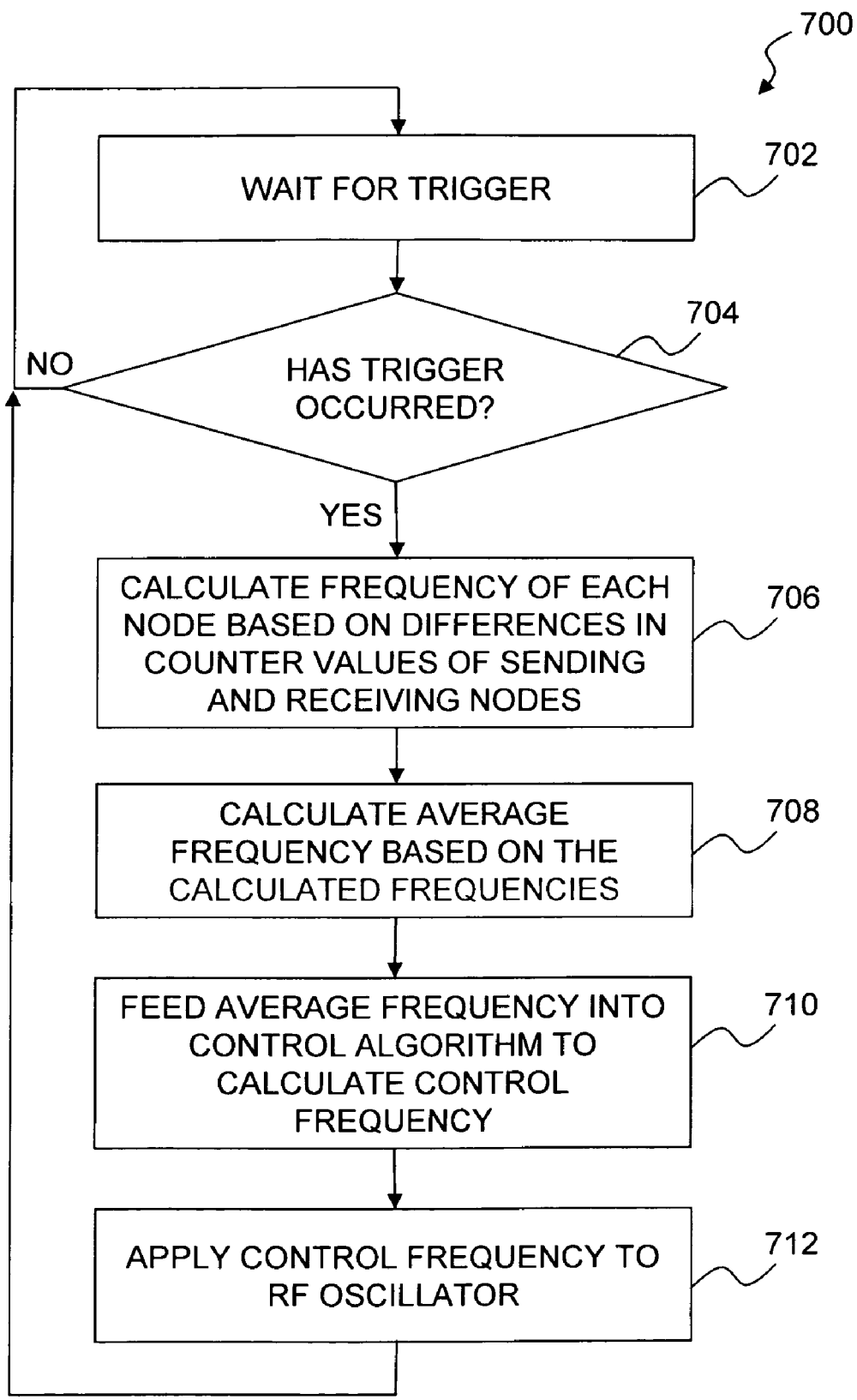
FIG. 7 is a flowchart illustrating one embodiment of a method for calculating an average frequency for use in a node.

Referring to FIG. 7, in another embodiment, a method 700 may be used by a node (e.g., the node 102 of FIG. 1) to determine when to process frequency synchronization messages. In steps 702 and 704, the method 700 waits for a trigger to occur. The trigger may be the expiration of a predefined time period (e.g., one second), a number of cycles of the node's RF oscillator, an interrupt, or another event that notifies the node 102 to execute the method 700. The method 700 may be given priority to minimize errors that may be caused by delays between the trigger and the execution of the remaining steps of the method.

It is understood that even if the node 102 and surrounding nodes are set to send frequency synchronization changes and perform control changes at a certain interval (e.g., one second), each node may have a slightly different definition of one second due to differences in their oscillators. Accordingly, the message transmission and synchronization may occur at slightly different intervals. However, this should not have an adverse impact on the overall outcome of the synchronization.

In step 706, once the trigger has occurred, the frequency of each node from which frequency synchronization messages have been received is calculated based on differences between the received counter values and the counter values of the receiving node stored with the received counter values. In some embodiments, the receiving node 102 may identify only certain nodes (e.g., the first four nodes in range) from which to process frequency synchronization messages. It is noted that the receiving node 102 can easily determine when one of the sending nodes' counters has rolled over from its maximum value to zero and compensate in the difference calculations. Furthermore, delays common to all transmissions are cancelled out by this difference function. In step 708, an average frequency may be calculated based on the frequencies calculated in step 706. In step 710, the average frequency may be fed into a control algorithm to calculate a control frequency and the control frequency may be used to set the receiving node's RF oscillator in step 712. Although not shown, the method 700 may reset the trigger. For example, after step 712, the method 700 may reset a time period used to trigger the next execution of the method 700.

In still other embodiments, different nodes may have different frequency oscillators. For example, the above discussions generally assume that all nodes have the same frequency oscillator (e.g., 10 MHz), even though there may be slight variations between the individual oscillators. However, if nodes have different frequency oscillators, the nodes need to agree on or be assigned a "standard" frequency for driving their counters. A "standard" count may then be calculated from the actual count. This could be standardized a priori or each node's frequency may be communicated with the synchronization message. For example, if the "standard" oscillator is 10 MHz, a node with a 20 MHz may either divide its count by two prior to sending it or transmit its count with a message that states that the count is based on a 20 MHz oscillator. In the latter case, the receiving node (with a 10 MHz oscillator) would then divide the received count by two to standardize it to 10 MHz.

Although only a few exemplary embodiments of this disclosure have been described in detail above, those skilled in the art will readily appreciate that many modifications are possible in the exemplary embodiments without materially departing from the novel teachings and advantages of this disclosure. Also, features illustrated and discussed above with respect to some embodiments can be combined with features illustrated and discussed above with respect to other embodiments. For example, various steps from different flow charts may be combined, performed in an order different from the order shown, or further separated into additional steps. Furthermore, steps may be performed by network elements other than those disclosed. Accordingly, all such modifications are intended to be included within the scope of this disclosure.

What is claimed is:

1. A method comprising:
   receiving, by a first node in a wireless non-hierarchical network, a plurality of frequency synchronization messages from at least second and third nodes;
   determining a frequency of the second node by comparing a difference between counter values contained in the frequency synchronization messages received from the second node to a difference between counter values of an oscillator of the first node that were saved at the time the frequency synchronization messages from the second node were received at the first node, wherein each of the counter values from the second node represents contents of a counter corresponding to an oscillator of the second node at the time one of the frequency synchronization messages was created at the second node;

determining a frequency of a third node using information contained in the frequency synchronization messages;

calculating an average frequency based on the frequency synchronization messages and the frequency of the second node and the third node;

calculating a control frequency based on the average frequency; and setting the oscillator of the first node to the control frequency.

2. The method of claim 1 wherein calculating the control frequency includes feeding the average frequency into a control algorithm.

3. The method of claim 1 further comprising:
storing the frequency synchronization messages; and
waiting for a trigger event to occur prior to calculating the average frequency.

4. The method of claim 1 wherein calculating the average frequency further includes:
averaging the frequency of the second and third nodes to calculate the average frequency.

5. The method of claim 1 wherein determining the frequency of the second node further includes:
calculating the difference between the counter values contained in the plurality of frequency synchronization messages received from the second node.

6. The method of claim 1 further comprising:
generating, by the first node, a plurality of frequency synchronization messages; and
sending the plurality of frequency synchronization messages to at least one of the first and second nodes.

7. The method of claim 1 further comprising standardizing counter values contained in the frequency synchronization messages received from the second node to compensate for a difference between a frequency of the second node and a standard frequency.

8. The method of claim 1 further comprising identifying at least the second and third nodes as nodes from which to process frequency synchronization messages, wherein frequency synchronization messages received from nodes not so identified are not processed.

9. The method of claim 1 further comprising associating a counter value of the first node with each of the received frequency synchronization messages.

10. A method comprising:
receiving, by a first node operating at a first frequency from a second node operating at a second frequency in a wireless non-hierarchical network, first and second synchronization messages containing first and second values, respectively, corresponding to contents of a first counter of the second node at the time the first and second synchronization messages were created, wherein the contents of the first counter are regularly modified based on the second frequency;
receiving, by the first node from a third node operating at a third frequency in the wireless non-hierarchical network, third and fourth synchronization messages containing third and fourth values, respectively, corresponding to contents of a second counter of the third node at the time the third and fourth synchronization messages were created, wherein the contents of the second counter are regularly modified based on the third frequency;
storing the first, second, third, and fourth counter values with a value corresponding to contents of a third counter of the first node at approximately the time the first, second, third, and fourth synchronization messages are received, respectively, wherein the contents of the third counter are regularly modified based on the first frequency;
calculating an average frequency of the second and third nodes based on the first, second, third, and fourth values in conjunction with the corresponding value of the contents of the third counter;
feeding the average frequency into a control algorithm to calculate a control frequency; and
setting the first frequency to the control frequency.

11. The method of claim 10 wherein calculating the average frequency includes:
calculating the second frequency of the second node based on a difference between the first and second values and the corresponding values of the contents of the third counter;
calculating the third frequency of the third node based on a difference between the third and fourth values and the corresponding values of the contents of the third counter; and
averaging the second and third frequencies to find the average frequency.

12. The method of claim 10 wherein the first and second synchronization messages include a frequency identifier representing a designated frequency of an oscillator of the second node, the method further comprising:
determining whether the designated frequency of the second node's oscillator equals a designated frequency of an oscillator of the first node; and
converting the first and second values to a standardized value if the designated frequencies are not equal.

13. The method of claim 10 further comprising waiting for trigger event to occur before calculating the average frequency.

14. The method of claim 10 further comprising:
sending, by the first node to the second node, fifth and sixth synchronization messages containing fifth and sixth values, respectively, corresponding to contents of the third counter at the time the fifth and sixth synchronization messages are created, wherein the contents of the third counter are regularly modified based on the first frequency.

15. The method of claim 10 wherein the storing and calculating are given priority over other processes within the first node.

16. A method comprising:
determining, by a first node in a wireless non-hierarchical network, that a predefined trigger event has occurred;
generating a frequency synchronization message containing a value corresponding to contents of a counter at the time the frequency synchronization message is generated, wherein the contents of the counter are regularly modified based on an oscillator frequency of the first node;
transmitting the frequency synchronization message to a second node in the wireless non-hierarchical network, wherein the value of the counter in the frequency synchronization message is configured to be used by the second node to determine a frequency of the first node; and
repeating the determining, generating, and transmitting steps in order to transmit a plurality of frequency synchronization messages to the second node, wherein a difference between values of the counter in the plurality of frequency synchronization messages is compared in the second node to a difference between counter values of an oscillator in the second node that are saved upon receipt at the second node of the plurality of frequency synchronization messages.

17. The method of claim 16 wherein generating the frequency synchronization message includes:
retrieving the value from the counter; and
inserting the value into a message with an identifier representing the first node in the wireless non-hierarchical network.

18. The method of claim 16 wherein generating the frequency synchronization message includes:
retrieving the value from the counter; and
inserting the value into a message containing information not related to the frequency synchronization message.

19. The method of claim 16 further comprising converting the value from a value based on the oscillator frequency to a value corresponding to a standardized frequency.

20. A device comprising:
a wireless communications interface configured to communicate with other devices in a wireless non-hierarchical network;
a controllable oscillator;
a memory coupled to a processor; and
a plurality of instructions stored in the memory for execution by the processor including instructions for:
receiving a plurality of synchronization messages from at least a first of the other devices;
determining a frequency of the first other device by comparing a difference between counter values contained in the synchronization messages received from the first other device to a difference between counter values associated with the controllable oscillator that were saved at the time the synchronization messages from the first other device were received, wherein each of the counter values from the first other device represents contents of a counter corresponding to an oscillator of the first other device at the time one of the frequency synchronization messages was created at the first other device;
calculating an average frequency based on the synchronization messages and the frequency of the first other device;
feeding the average frequency into a control algorithm to calculate a control frequency; and
setting a frequency of the controllable oscillator to the control frequency.

21. The device of claim 20 further comprising circuitry for priority processing of the synchronization messages.

22. The device of claim 21 wherein the circuitry includes a hardware-based counter coupled to the controllable oscillator.

23. The device of claim 22 wherein the hardware-based counter is incremented at each cycle of the controllable oscillator.

24. The device of claim 20 wherein the instructions for calculating the average frequency include instructions for:
calculating an individual frequency for at least some other devices from which synchronization messages have been received based on values contained within the synchronization messages; and
averaging the individual frequencies to calculate the average frequency.

25. The device of claim 20 wherein the instructions further include instructions for:
generating a synchronization message containing a counter value corresponding to the controllable oscillator; and
transmitting the synchronization message to at least one of the other devices via the wireless communications interface.

* * * * *